US012098280B2

(12) United States Patent
Menceloglu et al.

(10) Patent No.: US 12,098,280 B2
(45) Date of Patent: Sep. 24, 2024

(54) ZWITTERIONIC THIN FILM COMPOSITE MEMBRANES WITH HIGH PERFORMANCE

(71) Applicants: Sabanci Universitesi, Istanbul (TR); Istanbul Teknik Universitesi, Istanbul (TR)

(72) Inventors: Yusuf Ziya Menceloglu, Istanbul (TR); Serkan Unal, Istanbul (TR); Selda Erkoç Ilter, Istanbul (TR); Ismail Koyuncu, Istanbul (TR); Jalal Al Din Sharabati, Istanbul (TR); Serkan Guclu, Istanbul (TR); Derya Yuksel Imer, Istanbul (TR); Farzin Saffarimiandoab, Shenzhen (CN)

(73) Assignees: Sabanci Universitesi, Istanbul (TR); Istanbul Teknik Universitesi, Istanbul (TR)

( * ) Notice: Subject to any disclaimer, the term of this patent is extended or adjusted under 35 U.S.C. 154(b) by 1235 days.

(21) Appl. No.: 16/644,322

(22) PCT Filed: Aug. 10, 2018

(86) PCT No.: PCT/TR2018/050428
§ 371 (c)(1),
(2) Date: Mar. 4, 2020

(87) PCT Pub. No.: WO2019/147205
PCT Pub. Date: Aug. 1, 2019

(65) Prior Publication Data
US 2020/0207986 A1 Jul. 2, 2020

(30) Foreign Application Priority Data
Sep. 7, 2017 (TR) .................... 2017/13140

(51) Int. Cl.
*B01D 69/12* (2006.01)
*B01D 61/02* (2006.01)
(Continued)

(52) U.S. Cl.
CPC ............ C08L 83/08 (2013.01); B01D 61/025 (2013.01); B01D 71/56 (2013.01); C02F 1/441 (2013.01);
(Continued)

(58) Field of Classification Search
CPC ............. C08L 2205/04; C08L 2312/08; B01D 69/1251; B01D 71/56; B01D 2325/18
See application file for complete search history.

(56) References Cited

U.S. PATENT DOCUMENTS

| 9,662,615 B2 | 5/2017 | Roy et al. |
| 2006/0207930 A1 | 9/2006 | Yeager et al. |
| 2018/0011222 A1* | 1/2018 | Alli ....................... C08F 271/02 |

FOREIGN PATENT DOCUMENTS

| EP | 1356856 B1 * 12/2006 | ........... B01D 69/125 |
| WO | 2016007345 | 1/2016 |
| WO | 2016070247 | 5/2016 |

OTHER PUBLICATIONS

Ma, Rong, et al. "High-flux and fouling-resistant reverse osmosis membrane prepared with incorporating zwitterionic amine monomers via interfacial polymerization." Desalination 381 (2016): 100-110. (Year: 2016).*
(Continued)

*Primary Examiner* — Bradley R Spies
(74) *Attorney, Agent, or Firm* — Bond, Schoeneck & King, PLLC

(57) ABSTRACT

The invention relates to polyamide polymeric films comprising zwitterionic polysiloxane. The films of the invention may be used for providing high performance in the filtration applications.

11 Claims, 4 Drawing Sheets

(51) Int. Cl.
  B01D 71/56   (2006.01)
  C02F 1/44    (2023.01)
  C08G 77/26   (2006.01)
  C08G 77/28   (2006.01)
  C08L 83/08   (2006.01)

(52) U.S. Cl.
  CPC ............ C08G 77/26 (2013.01); C08G 77/28 (2013.01); *B01D 69/1251* (2022.08); *B01D 2325/18* (2013.01); *C08L 2205/04* (2013.01); *C08L 2312/08* (2013.01)

(56) References Cited

OTHER PUBLICATIONS

International Search Report and Written Opinion for International Application No. PCT/TR2018/050428, dated Jul. 11, 2019; 7 pages.
Erkoc Ilter, Selda, et al.; High performance polyamide thin film composite (PA_TFC) desalination membranes modified by zwitterionic silanes; 254th National Meeting and Exposition of the American-Chemical-Society, Washington, DC; Published Aug. 20, 2017; http://research.sabanciuniv.edu/35862/; 36 pages.

\* cited by examiner

ZWITTERIONIC THIN FILM COMPOSITE MEMBRANES WITH HIGH PERFORMANCE

REFERENCE TO RELATED APPLICATION

This application is a U.S. National Phase filing of International Application No. PCT/TR2018/050428, filed Aug. 10, 2018, which relates and claims priority to Turkish Application No. 2017/13140, filed Sep. 7, 2017, the entirety of each of which are hereby incorporated by reference in their entirety.

TECHNICAL FIELD

The invention relates to polyamide polymeric films comprising zwitterionic polysiloxane. The films of the invention may be used for providing high performance in the filtration applications.

PRIOR ART

The need for fresh water rapidly increases depending on the increase of human population and development of the industry and agriculture around the world. Thus, water purification technologies gain importance recently. In view of the fact that 97% of the water reserves in the world is salt water and only 0.5% of it is potable fresh water, it is obvious that the ultimate way of obtaining fresh water for consumption by the human and animals, for irrigation, and other industrial usages is the process of removing dissolved salt and other minerals in the sea water or salt water.

The separation technique using desalination process may be divided into two categories on (i) thermal and (ii) membrane basis. Reverse osmosis is widely used across the world since it is the most energy-efficient desalination technology known presently. In 1975, the first promotion of commercial reverse osmosis (RO) membranes in Jeddah sea water desalination plant was a milestone in the field of desalination technology. From that day on, the usage of desalination membrane systems with reverse osmosis (RO) has rapidly become widespread. Today, 16 million $m^3$/day water is processed by this method.

The significant point making reverse osmosis (RO) desalination membrane technology economically more desirable was that ultra-thin active polymer layer was developed at the top (<0.2 □m), polysulfone (PSf) support layer having a porous structure was developed at the middle and polyamide thin film composite membranes consisting of non-woven polyester fabrics were developed at the bottom (FIG. 1).

Active polyamide layer is created on the porous support layer by the interfacial polymerization method. In the state of the art, m-phenylene diamine (MPD) and trimesoyl chloride (TMC) monomers are used in accordance with a patent which was published by Cadotte, for creating the active polyamide layer.

Today, MPD and TMC monomers are used in many desalination membranes due to the features provided by thereof. Interfacial polymerization is a polymerization type growing gradually and occurring on the interface of an aqueous phase including MDP and an organic phase including TMC (FIG. 3). Thus, densely cross-linked aromatic polyamide (PA) active layer is formed on the micro-porous support layer being consisting of polysulfone (PSf) generally.

Two main problems are faced in RO membranes, which are sorted as (i) the balance between the water flow and salt rejection and (ii) membrane contamination.

Water flow performance developed for RO membranes provides energy and cost efficiency during membrane filtration processes. Maintaining salt rejection in the acceptable values (>99%) while increasing the water flow is a challenge issue and it has not been addressed in the known art adequately. Therefore, various strategies have been applied for increasing flow performances of RO membranes.

The most commonly used methods for developing flow performance are using different active layer monomers, introducing co-solvents during the interfacial polymerization or adding hydrophilic additives (monomers), surface modifications, and introducing nanoparticles such as zeolite or silica during the interfacial polymerization.

Membrane contamination generally occurs upon the accumulation of the substances causing contamination on the membrane surface and membrane pores and it shortens the lifetime of the membrane.

Contamination may be organic contamination, inorganic contamination, colloidal contamination or biologic contamination. Contamination is considerably affected by the surface properties such as surface hydrophilicity, surface charge and surface roughness. Increasing hydrophilicity on the surface, adjusting surface charge depending on the type of the contamination, and decreasing surface roughness are the main objectives for reducing undesirable reactions between contaminants and membrane surface, in terms of developing composite membranes having a low biologic contamination property. Increasing hydrophilicity of the membrane surface may facilitate the passage of water molecules, which causes an increase in the water flow.

Chlorine compounds such as sodium hypochlorite (NaOCl) are used as cleaning material for protecting the original performance of PA-TFC (polyamide thin film composite) RO membranes which was reduced by the contamination in general. However, amide nitrogens and aromatic rings are the chlorine-sensitive groups in PA film. Chlorine may react with these groups and may deteriorate PA active layer, which leads to a deterioration in salt rejection performance. Therefore, various experiments should be performed in order to enhance chlorine resistance of RO membranes. Novel membranes were prepared having totally different chemistry from PA structure in order to develop chlorine resistance in such membranes in the art. In another aspect, chemical structure of PA was modified for eliminating chlorine-resistant areas from the membrane. Though chlorine resistance of the membranes obtained by this method is increased, they could not compete with the membranes being in use commercially in terms of water flow and salt rejection performance.

Consequently, all the problems mentioned above necessitated introducing a novelty for the related technical field.

BRIEF DESCRIPTION OF THE INVENTION

Present invention relates to a polymer network interpenetrating with zwitterionic polysiloxane-polyamide, in order to prevent the disadvantages mentioned above and to supply the technical field with new advantages. Interpenetrating polymer network of the invention is suitable for the usage as an active polyamide layer in reverse osmosis (RO) membranes.

An object of the invention is to provide solution for the contamination problems and the inadequacies in the water flow and salt rejection performances of the membranes, which are present in the state of the art.

Present invention mentioned above relates to a polymer network interpenetrating with zwitterionic polysiloxane-polyamide for achieving all the objects to arise in the detailed description. Thus, while zwitterionic polysiloxane structure which was introduced into the polyamide structure through interpenetrating polymer network creates a hydrophilic passage for water transfer, high salt rejection is enabled by means of polyamide structure. Also, zwitterionic structure contribute to the contamination features and chlorine resistance of the membrane through the electrostatic hydration layer and steric hindrance it provides. Thus, the membranes including the polymer network interpenetrating with zwitterionic polysiloxane-polyamide enables to overcome all the problems of polyamide thin film composite (PA-TFC) reverse osmosis (RO) membranes present in the state of the art.

DETAILED DESCRIPTION OF THE INVENTION

Figure 1:
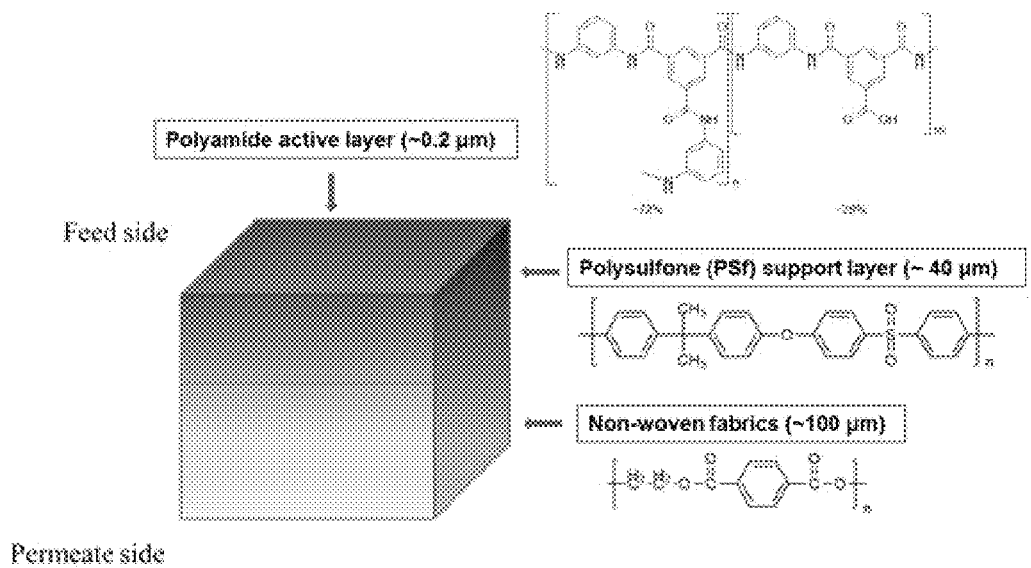
In FIG. 1, a representative view of polyamide reverse osmosis membranes used in the state of the art is presented.
Figure 2:
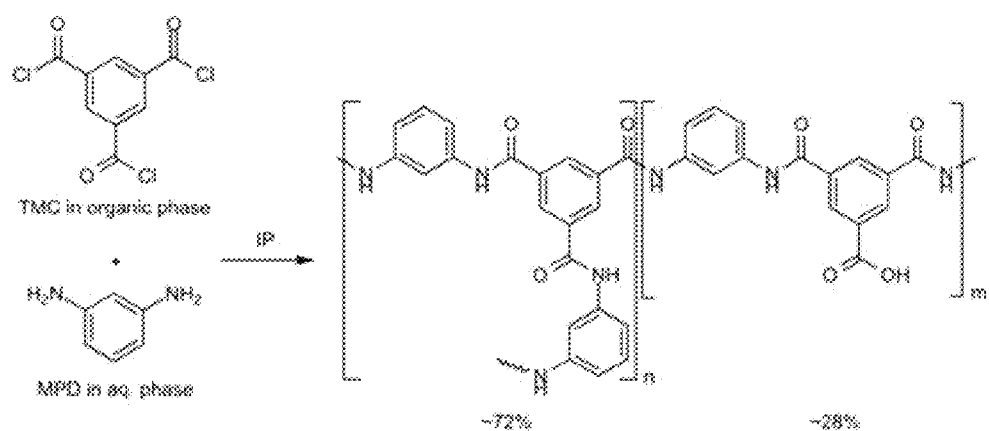
In FIG. 2, a representative scheme is presented belonging to the aromatic polyamide structure obtained from MPD and TMC by interfacial polymerization.
Figure 3:
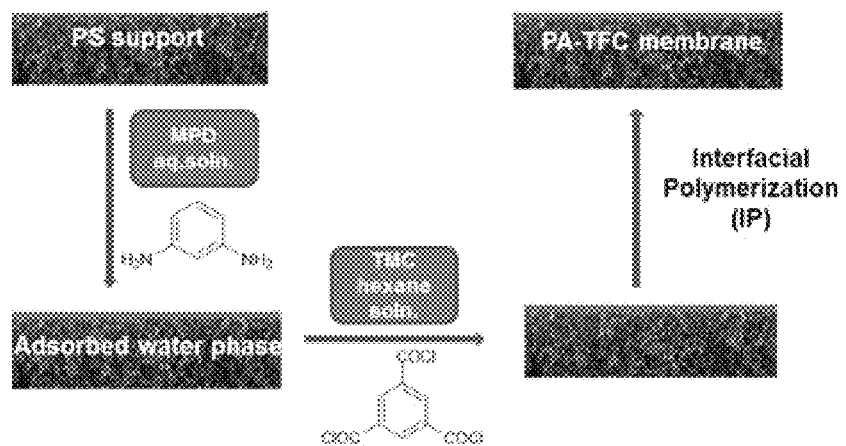
In FIG. 3, a representative view of the interfacial polymerization is presented which is realized by using MPD and TMC monomers.

The invention relates to a zwitterionic polysiloxane-polyimide interpenetrating polymer network as stated above.

"Zwitterionic" term used herein means molecules having a neutral structure having both positive and negative charges on itself.

"Polysiloxane" term used herein means polymers including silicone and oxygen atoms. Said polymers may be obtained from the monomers including silicone and oxygen.

"Reverse osmosis membrane" term used herein means semi-permeable membranes which are used for filtrating dissolved or suspended contaminations in a fluid. In a preferred embodiment of the invention, an interpenetrating polymer network of the invention is present on the polysulfone support layer in the reverse osmosis membrane structure.

"Interpenetrating polymer network" term used herein means at least two polymer structures interpenetrating each other. Said interpenetrating polymer networks does not separate from each other unless said interpenetrating polymer networks are a mixture of two separate polymers and unless the chemical bonds are broken. During creating interpenetrating polymer network in accordance with the invention, some physical and chemical reactions may occur between two polymer networks, which contributes to strengthening the interpenetrating polymer network obtained.

A preferred embodiment of the invention is a polyamide-polysiloxane interpenetrating polymer network produced by the interfacial polymerization consisting of an organic phase and an aqueous phase and characterized in that it is obtained by the polymerization of m-phenylene diamine (MPD) and zwitterionic trialkoxy silane monomers in the aqueous phase and trimesoyl chloride (TMC) monomers in the organic phase. Thus, an interpenetrating polymer network is obtained consisting of polyamide and polysiloxane, said polymer network being suitable to usage as a thin film composite membrane. Polysiloxane structure in the polyamide structure of the composite membranes comprising polymer network in accordance with the invention will both positively affect the water passage by creating a hydrophilic passage and will enhance the chlorine resistance and anti-contamination feature of the membrane by means of its zwitterionic structure. Additionally, polyamide-polysiloxane interpenetrating polymer network and reverse osmosis membranes and/or thin layer composite membranes obtained from this network have a higher mechanic power by means of the presence of organic-inorganic hybrid structure, which enhances the lifetime of the membrane.

In a preferred embodiment of the invention, said interfacial polymerization is performed on a support layer. Said support layer is preferably made of polysulfone material and have a porous and/or micro-porous structure.

In another preferred embodiment of the invention, zwitterionic polysiloxane is obtained by sol-gel condensation polymerization method.

The structure of zwitterionic trialkoxy silane monomers are shown by formula I in accordance with the invention.

$(R^1O)_3Si-R^2-X^+-R^3-Y^-$  Formula I wherein $R^1$ is selected from C1-C2 alkyl groups, $R^2$ is selected from C3 alkyl groups, $R^3$ is selected from C1-C3 alkyl groups; and X and Y is different positive or negative charged groups.

Zwitterionic trialkoxy silanes are divided into sulfobetaine silane, carboxybetaine silane, phosphatobetaine silane groups according to their charged groups.

Accordingly, trialkoxy silanes may be selected from (a) sulfobetaine silane, (b) carboxybetaine silane, or (c) phosphatobetaine silane; (a) for sulfobetaine silanes; $X^+=R^4_2N^+$, wherein $R^4$ is is substituted or nonsubstituted alkyl group or —H and $Y^-=SO_3^-$; (b) for carboxybetaine silanes, $R^4_2N^+$, wherein $R^4$ is substituted or nonsubstituted alkyl group or —H and $-Y^-=CO_2^-$; (c) for phosphatobetaine silanes, $X^+=R^4_2N^+$, wherein $R^4$ is substituted or nonsubstituted alkyl group or —H and $Y^-=R^5PO_4^-$, wherein $R^5$ is substituted or nonsubstituted alkyl group.

Figure 4:
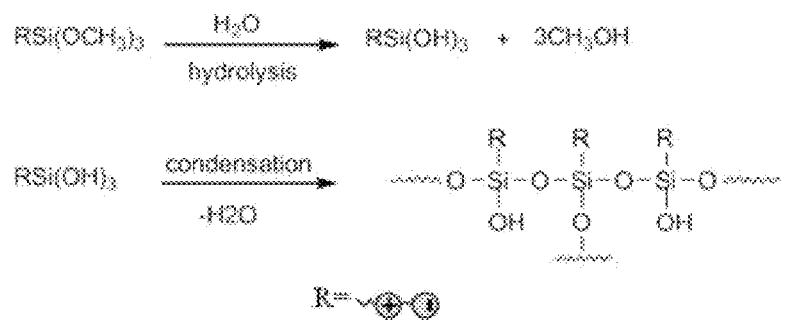
In FIG. 4, a scheme is presented showing obtaining zwitterionic trialkoxy silane molecules by sol-gel condensation reaction of zwitterionic polysiloxane present in the interpenetrating polymer network of the invention.

In an embodiment of the invention, sol-gel polymerization is used to form polysiloxane polymer being present in the structure of polyamide-polysiloxane interpenetrating polymer network of the invention. In this method, silane-binding agents are used during the surface polymerization, there agents are hydrolyzed in water, and then they leave the water and are subjected to the condensation polymerization. Consequently, zwitterionic network structure is created (FIG. 4).

Accordingly, an embodiment of the invention is polyamide-polysiloxane interpenetrating polymer network created by the interfacial polymerization consisting of an organic phase and an aqueous phase characterized in that it is obtained by the polymerization of m-phenylene diamine (MPD) and zwitterionic trialkoxy silane monomers shown by formula I in the aqueous phase and trimesoyl chloride (TMC) monomers in the organic phase.

A preferred embodiment of the invention is related to a method that is used for obtaining zwitterionic polysiloxane-polyimide interpenetrating polymer network and said method comprises following steps:
 a) dissolving m-phenylene diamine (MPD) and zwitterionic trialkoxy silane monomers in the aqueous phase
 b) dissolving trimesoyl chloride (TMC) monomers in the organic phase, and
 c) obtaining polymer network interpenetrating with the polymerization between the organic phase and the aqueous phase.

In a method used to obtain a zwitterionic polysiloxane-polyamide interpenetrating polymer network in a preferred embodiment of the invention, zwitterionic trialkoxy silane monomer is selected from the monomers shown by the formula I and preferably from a group consisting of sulfobetaine silane, carboxybetaine silane, or phosphatobetaine silane.

In a method used to obtain a zwitterionic polysiloxane-polyamide interpenetrating polymer network in a preferred embodiment of the invention, silane-binding agents are used in addition to the monomers in the aqueous phase.

In a method used to obtain a zwitterionic polysiloxane-polyamide interpenetrating polymer network in a preferred embodiment of the invention, any solvent may be used present in the state of the art in order to prepare organic phase.

A preferred embodiment of the invention relates to thin film composite membranes comprising zwitterionic polysiloxane-polyamide interpenetrating polymer network in accordance with the invention.

A preferred embodiment of the invention relates to reverse osmosis thin film composite membranes comprising zwitterionic polysiloxane-polyamide interpenetrating polymer network in accordance with the invention.

A preferred embodiment of the invention relates to reverse osmosis thin film membranes comprising zwitterionic polysiloxane-polyamide interpenetrating polymer network as an active layer in accordance with the invention.

A preferred embodiment of the invention is related to thin film composite membranes consisting of an organic phase and an aqueous phase and comprising polyamide-polysiloxane interpenetrating polymer network obtained by the polymerization of m-phenylene diamine (MPD) and zwitterionic trialkoxy silane monomers in the aqueous phase produced by interfacial polymerization and trimesoyl chloride (TMC) monomer in the organic phase.

A preferred embodiment of the invention is related to reverse osmosis thin film composite membranes consisting of an organic phase and an aqueous phase and comprising polyamide-polysiloxane interpenetrating polymer network obtained by the polymerization of m-phenylene diamine (MPD) and zwitterionic trialkoxy silane monomers in the aqueous phase produced by interfacial polymerization and trimesoyl chloride (TMC) monomer in the organic phase.

A preferred embodiment of the invention is related to reverse osmosis thin film membranes consisting of an organic phase and an aqueous phase and comprising polyamide-polysiloxane interpenetrating polymer network as an active layer obtained by the polymerization of m-phenylene diamine (MPD) and zwitterionic trialkoxy silane monomers in the aqueous phase produced by interfacial polymerization and trimesoyl chloride (TMC) monomer in the organic phase.

A preferred embodiment of the invention is related to the use of zwitterionic polysiloxane-polyamide interpenetrating polymer network of the invention in the production of thin film composite membrane and/or thin film composite reverse osmosis membrane. Polymer network of the invention will be used preferably on a micro-porous support layer as an active layer in the production of thin film composite membrane and/or thin film composite reverse osmosis membrane.

A preferred embodiment of the invention is related to the use of polyamide-polysiloxane interpenetrating polymer network produced by interfacial polymerization and obtained by the polymerization of m-phenylene diamine (MPD) and zwitterionic trialkoxy silane monomers in the aqueous phase and trimesoyl chloride (TMC) monomer in the organic phase in the production of thin film composite membrane and/or thin film composite reverse osmosis membrane. Said polymer network will be used preferably on a micro-porous support layer as an active layer in the production of thin film composite membrane and/or thin film composite reverse osmosis membrane.

A preferred embodiment of the invention is related to the use of thin film composite membranes and/or reverse osmosis thin film composite membranes comprising zwitterionic polysiloxane-polyimide interpenetrating polymer network of the invention for water purification.

"Water purification" term used herein means removal of the undesirable chemicals, salts, biologic wastes, suspended solids, and gases from the water.

In this detailed description, zwitterionic polysiloxane-polyamide interpenetrating polymer network of the invention is described by the examples for better understanding the issue and without any limiting effect.

EXAMPLES

Figure 5:
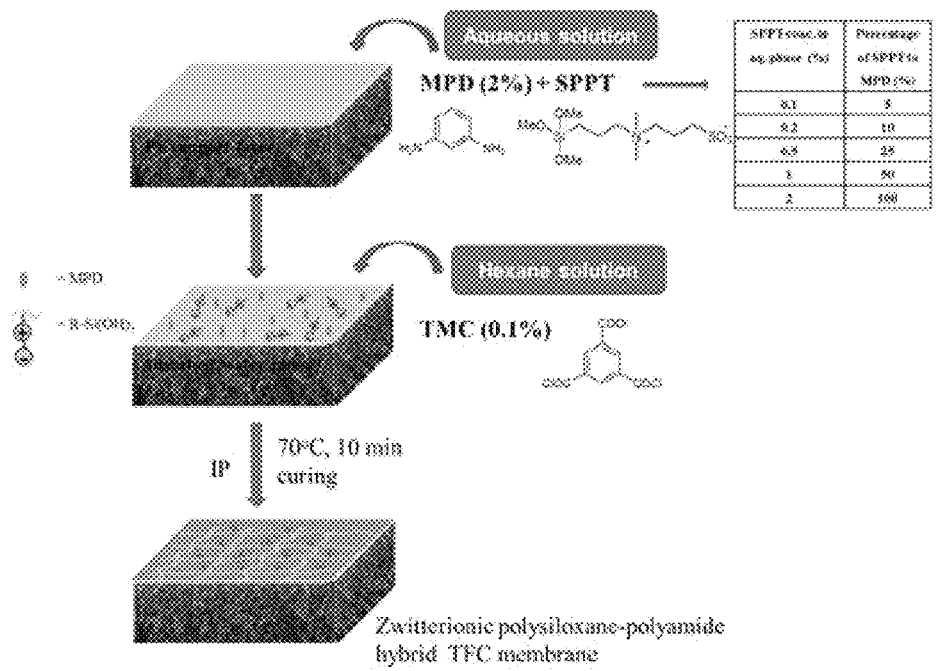
In FIG. 5, a scheme is presented showing the preparation of SPPT monomer used in obtaining interpenetrating polymer network of the invention and providing said network with a zwitterionic form by introducing zwitterionic silanes into the polyamide network of the thin film composite reverse osmosis membrane.

Zwitterionic sulfobetaine trialkoxysilane monomer (SPPT) was synthesized and it was added to aqueous MPD solution of 2% being present in order to form interpenetrating polymer network by performing interfacial polymerization with TMC on the polysulfone support layer, with various concentrations (5%, 10%, 25%, 50%, 75%, and 100%) (FIG. 5).

Three samples were prepared from each membrane and the membranes prepared without using zwitterionic silane monomer were used as the control membranes.

Cross-flow reverse osmosis tests were carried out under the sea water desalination conditions (32 g/L NaCl, 55 bar) and salt rejection was calculated basing upon filtrate conductivity. Also chlorination experiment was performed under the same conditions, but 500 ppm chlorine was added for 8 hours. Chemical structures and compounds were characterized in order to show that zwitterionic structure was introduced into the structure of the membranes obtained. Also, membrane performances were evaluated.

Figure 6:
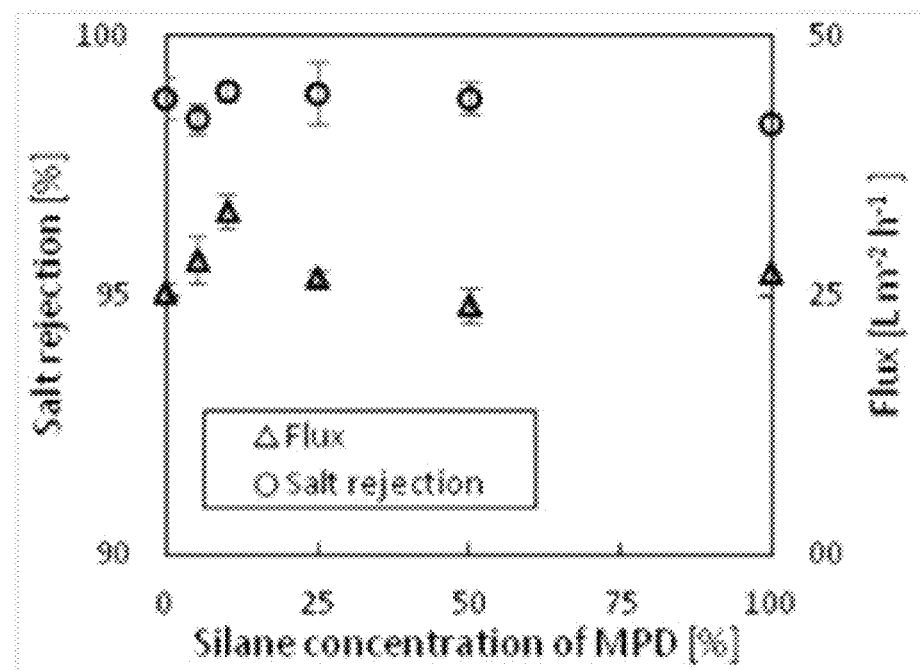
In FIG. 6, a chart is presented including the results of flowing and salt rejection performances of the membranes obtained by the polymer networks of the invention. All the average performance results are obtained with 55 bar operation pressure, 5 L/min cross-flow rate and 32 g/L NaCl feed solution at 25° C.

Control membranes and membranes of the invention were evaluated according to water flow and salt rejection performances thereof by using sea water desalination test procedure (FIG. 6). Though there is a noticeable development in the water flow performance of the membranes having certain silane monomer concentrations, a decrease is not observed in the salt rejection. The most significant development observed in the water flow is observed in the membranes prepared with zwitterionic silane monomer (SPPT) of 10%. Water flow increased in these membranes from 25.3 to 33.4 L·m−2·h−1, which indicates that there is an increase of 31% in water flow, compared to the control membrane.

Figure 7:
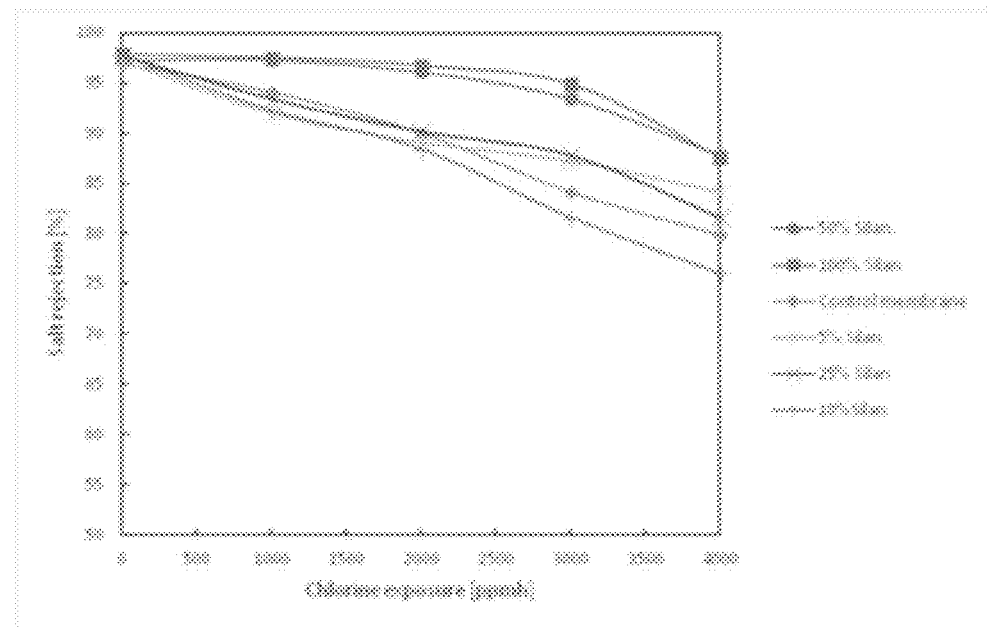
In FIG. 7, a chart is presented showing the effect of contacting the membranes obtained by the polymer network of the invention to the chlorine for 8 hours on the salt rejection performance.
Figure 8:
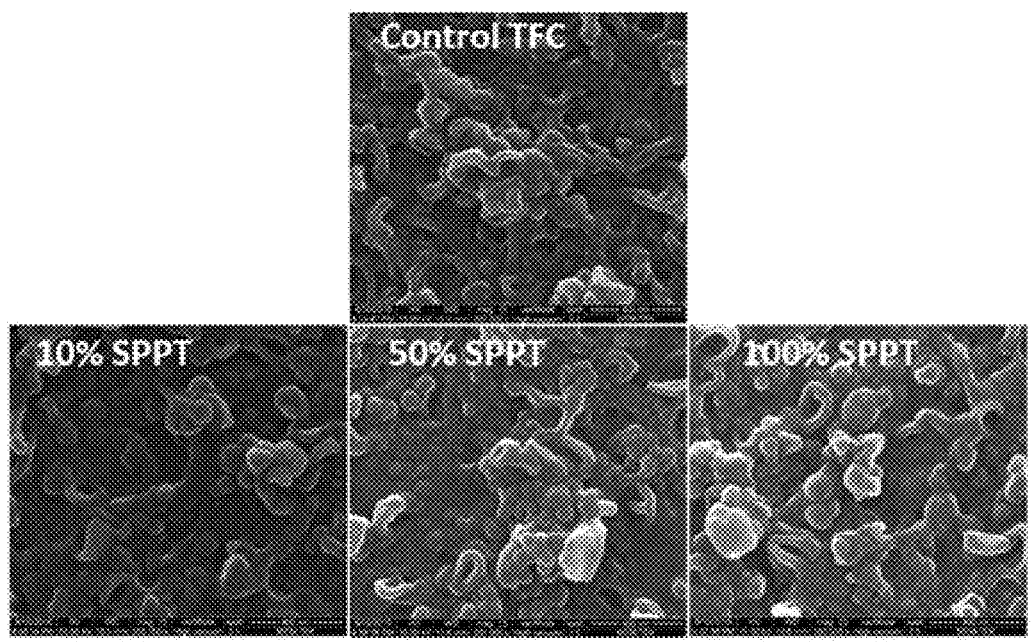
In FIG. 8, a view of SEM surface morphologies of the membranes obtained by the polymer network of the invention.

It is observed from FIG. 7 that the membranes prepared with zwitterionic silane monomer (SPPT) with a proportion of 50% and 100% (SPPT/MPD=1) had an enhanced chlorine resistance. While a considerable membrane damage and loss of salt rejection occurs for the membranes of the invention after 3000 ppm·h, control membranes experience chlorine damage after 1000 ppm·h.

Surface morphologies of the membranes of the invention obtained were characterized through SEM. Crest and trough appearance was observed in all reverse osmosis membranes of the invention as a general feature of the aromatic polyamide reverse osmosis membranes. In the membranes of the invention, while SPPT proportion increases, it is seen that crest and trough appearance is emphasized more and it becomes much looser compared to the control membranes.

Example 1: The Synthesis of 3-(dimethyl(3-(trimethoxysilyl)propyl)ammonio)propane-1-sulphonate or (3-sulphopropylbetaine-propyl)-trimethoxysilane (SPPT)

A magnetic stirrer bar is added to the empty reaction flask and its end is closed by rubber septa and the air is enabled to be eliminated by subjecting the flask to nitrogen for 30 minutes. 2.07 g [3-(dimethylamino)propyl]trimethoxysilane (DMAPTMS) (0.01 mol, 2.19 mL), 1.22 g 1,3-propane sultone (0.01 mol, 0.88 mL), and 10 ml anhydrous acetone is added to the reaction flask under the nitrogen atmosphere. The obtained mixture is stirred for 2 hours at room temperature under the nitrogen atmosphere. The obtained raw product is washed with anhydrous acetone three times in order to remove the chemicals which does not react with the obtained raw product. The obtained pure product is dried for one night under vacuum and stored under the nitrogen atmosphere (1.82 g, 55% efficiency). 1H NMR and 13C NMR spectra of the product are measured by Varian Unity Inova 500-MHz spectrometer. H NMR (CDCl3): □ 0.66 (t, 2H, Si—CH2-C—C—N), 1.82 (m, 2H, Si—C—CH2-C—N), 2.24 (m, 2H, N—C— CH2-C—S), 2.89 (t, 2H, N—C—C—CH2-S), 3.20 (s, 6H, 2×N—CH3), 3.32 (t, 2H, Si—C—C—CH2-N), 3.59 (s, 9H, 3×CH3-O—Si), 3.73 (t, 2H, N—CH2-C—C—S) ppm. 13C NMR (CDCl3): 5.68 (Si—C—C— C—N), 16.48 (Si—C—C—C—N), 19.44 (N—C—C—C—S), 47.89 (CH3-O—Si), 50.33 (N—C—C—C—S), 50.78 (N—CH3), 63.55 (N—C—C—C—S), 65.96 (Si—C—C—C—N) ppm.

Example 2: Production of Polysulfone (PSf) Support Layer in Pilot Scale

Polysulfone support layer is prepared through wet-phase inversion method by using flat layer membrane production machine. Cast polymer solution is prepared by adding PSf (18% by weight), PVP10 (10 kDa polyvinylpyrrolidone) (4.5% by weight), and PVP40 (40 kDa) (1.5% by weight) into N,N-dimethyl formamide. Said mixture is stirred for 24 hours at 50° C. and a homogeneous cast solution is obtained by using ultrasonic bath and eliminating air for 2 hours. Pilot scale machine has a capacity of carry out production with a thickness of 1 meter and with the desired size. Cast solution is poured in front of a scraping knife and leaded onto the polyester carrier with a non-homogeneous structure with a space of 130 μm. Then, movable polyester layer (3 m/min) is immersed into the coagulation water bath in order to obtain polysulfone membrane (15° C.). Polysulfone support layer is produced in a sponge-like structure and with a thickness of 40 micrometer.

Example 3: Preparation of Control Polyamide Membranes

Polysulfone membrane surface is contacted to 2% MPD aqueous solution (w/v) comprising 2% (w/v) TEA (triethylamine), 5% CSA (camphor sulfonic acid), and 0.1% (w/v) SDS (sodium dodecyl sulfate) for 5 minutes. The excess solution is removed by a rubber cylinder and membrane is cooled for 2 minutes at room temperature. Then, TMC solution of 0.1% (w/v) in hexane is poured onto the membrane surface in order to enable it to react for 1 minutes. Finally, hexane solution is scraped from the surface of the membrane and the membrane is cured in a furnace at 70° C. for 10 minutes in order to provide more cross-linking.

Example 4: Preparation of Polysiloxane-Polyamide Membranes

The preparation of polysiloxane-polyamide membranes is the same as the procedure used in the preparation of control polyamide membranes except that trialkoxy silane monomer is added to the aqueous phase. SPPT monomers having different concentrations (5%, 10%, 25%, 50%, 75%, 100% by weight in proportion to MPD monomer) is added into MPD aqueous solution of 2% comprising TEA of 2% (w/v), CSA of 5% (w/v) and SDS of 0.1% (w/v) in order to create interpenetrating polysiloxane-polyamide polymer network. Then, TMC solution of 0.1% (w/v) in hexane is poured onto the membrane surface in order to enable it to react for 1 minutes. Finally, hexane solution is scraped from the surface of the membrane and the membrane is cured in a furnace at 70° C. for 10 minutes in order to provide more cross-linking.

Example 5: Flow and Salt Rejection Experiments

Membrane performances are determined by using a high-pressure cross-flow filtration system consisting of feed tank, high pressure pump, filter cartridge, membrane cell, filtrate tank, and computer recording the pressure, flow, pH, temperature and conductivity (FIG. 10). Active filtration area in the membrane filtration cell is 140 cm$^2$. The filtrate is accumulated in the filtrate tank while it returns to the concentrated fluid feed tank and the amount of the accumulated filtrate is measured, during filtration. The weight of the filtrate is continuously measured by a digital weighing means connected to the computer. In the performance tests, 3200 ppm NaCl solution was used under a pressure of 55 bar. Filtrate flow and salt rejection were measured after providing stabilization for 60 minutes. Performance results were reported by determining the average of 3 membranes produced for each silane concentration. Salt rejection and filtrate flow was calculated by $$J_w = \frac{\Delta V}{(\Delta T \cdot Am)}$$

Example 6: Chlorination Experiments

After measuring the membrane performance, the system continued to operate under the same conditions following the sodium hypochlorite (NaOCl) addition to the sodium chloride tank. The concentration of the sodium chloride was arranged as 32000 ppm and the active chloride concentration was 500 ppm. The system was operated with a pressure of 55 bar for 8 hours. The results of the performance is taken in each two hours, which means that the membrane is subjected to 1000 ppm·h chlorine. The results of the chlorination are reported by determining the average of the obtained result for three membranes.

The protection scope of the invention is determined in the appended claims and it is not confined to those disclosed for illustration in this detailed description. It is obvious that the person skilled in the art will be able to present similar embodiments in consideration of those disclosed above without departing from the main theme of the invention.

The invention claimed is:

1. An interpenetrating polymer network, characterized in that the network contains zwitterionic trialkoxy silane shown by Formula I and polyamide, $$(R^1O)_3Si-R^2-X^+-R^3-Y^- \quad \text{Formula I}$$

wherein $R^1$ is selected from $C_1$-$C_2$ alkyl groups, $R^2$ is selected from $C_3$ alkyl groups, $R^3$ is selected from $C_1$-$C_3$ alkyl groups and X and Y are different positive or negative charged groups.

2. The polymer network according to claim 1, characterized in that it is selected from zwitterionic trialkoxy silane sulfobetaine silane, carboxybetaine silane, phosphatobetaine silane groups shown by Formula I.

3. The polymer network according to claim 2, characterized in that $X^+=R^4{}_2N^+$ for sulfobetaine silanes wherein $R^4$ is determined as substituted or nonsubstituted alkyl group or —H or $Y^-=SO_3{}^-$.

4. The polymer network according to claim 2, characterized in that $R^4{}_2N^+$ for carboxybetaine silanes wherein $R^4$ is determined as substituted or nonsubstituted alkyl group or —H or $Y^-=CO_2—$.

5. The polymer network according to claim 2, characterized in that $X^+=R^4{}_2N^+$ for phosphatobetaine silanes wherein $R^4$ is determined as substituted or nonsubstituted alkyl group or —H and $Y^-=R^5PO_4{}^-$, and wherein $R^5$ is determined as substituted or nonsubstituted alkyl group.

6. A method to be used for preparing a polymer network according to claim 1, characterized by comprising following steps:
    a) dissolving m-phenylene diamine (MPD) and zwitterionic trialkoxy silane monomers in the aqueous phase
    b) dissolving trimesoyl chloride (TMC) monomers in the organic phase, and
    c) obtaining polymer network interpenetrating with the polymerization between the organic phase and the aqueous phase.

7. The method according to claim 6, characterized in that zwitterionic trialkoxy silane monomers are selected from the monomers shown by the formula I.

8. The method according to claim 7, characterized in that zwitterionic trialkoxy silane monomer is selected from a group consisting of sulfobetaine silane, carboxybetaine silane, or phosphatobetaine silane.

9. The method according to claim 6, characterized in that silane-binding agents are used in addition to the monomers in the aqueous phase.

10. Thin film composite membranes characterized by comprising the interpenetrating polymer network according to claim 1.

11. Thin film composite membrane according to claim 10, characterized in that it is reverse osmosis thin film membrane.

* * * * *